Figure 1:
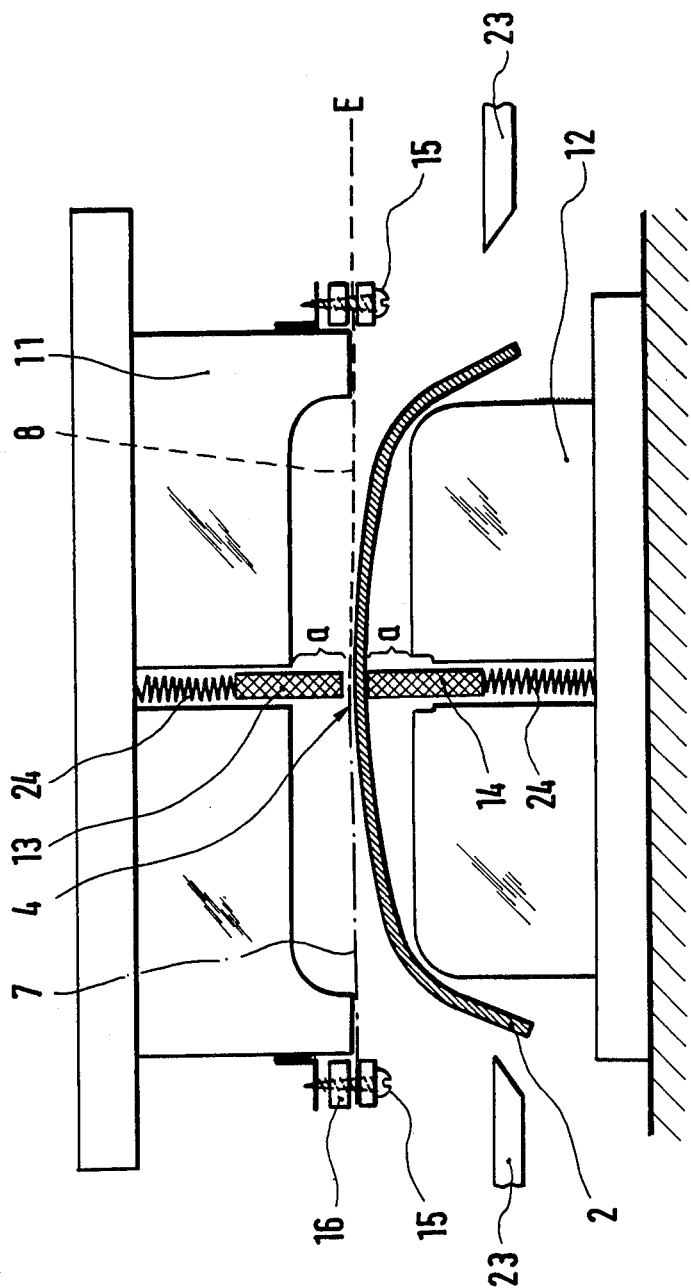

United States Patent [19]

Kobe

[11] Patent Number: 4,614,558

[45] Date of Patent: Sep. 30, 1986

[54] METHOD AND APPARATUS FOR MAKING A SURFACE-LINED ARTICLE

[75] Inventor: Michael Kobe, Wasserburg, Fed. Rep. of Germany

[73] Assignee: Plastifol-Manfred Rothe KG., Fed. Rep. of Germany

[21] Appl. No.: 680,387

[22] Filed: Dec. 11, 1984

[30] Foreign Application Priority Data

Dec. 16, 1983 [DE] Fed. Rep. of Germany ....... 3345626

[51] Int. Cl.⁴ ............................................. B32B 31/10
[52] U.S. Cl. .................................... 156/163; 156/212; 156/228; 156/245; 156/475; 156/494
[58] Field of Search ............... 156/163, 212, 228, 245, 156/475, 494; 297/DIG. 2; 296/39 R

[56] References Cited

FOREIGN PATENT DOCUMENTS 3109338 9/1982 Fed. Rep. of Germany .

Primary Examiner—Robert A. Dawson
Attorney, Agent, or Firm—Renner, Otto, Boisselle & Lyon

[57] ABSTRACT

The invention relates to a method for making a surface-lined shaped article, particularly an interior facing member for a motor vehicle, such shaped article having a backing member which is heated in an undeformed state and then inserted into a temperature-adjusted die assembly in which a liner material is provided facing the finally visible surface of the backing member to which it is bonded as the backing member is being deformed or shaped. An object of the present invention is the provision of a method of the type defined above which permits a shaped article to have at least two surface areas thereof lined with different liner materials in a simple and economical manner. For attaining this object, the invention provides that the surface liner material is clamped in the die assembly in the form of at least two cuttings covering different areas of the backing member, and the backing member is brought into pressure contact with the clamped cuttings along at least one overlap or abutment line, or a connection line, respectively, by means of gripper elements acting from above and below, prior to the backing member being deformed together with the cuttings.

5 Claims, 10 Drawing Figures

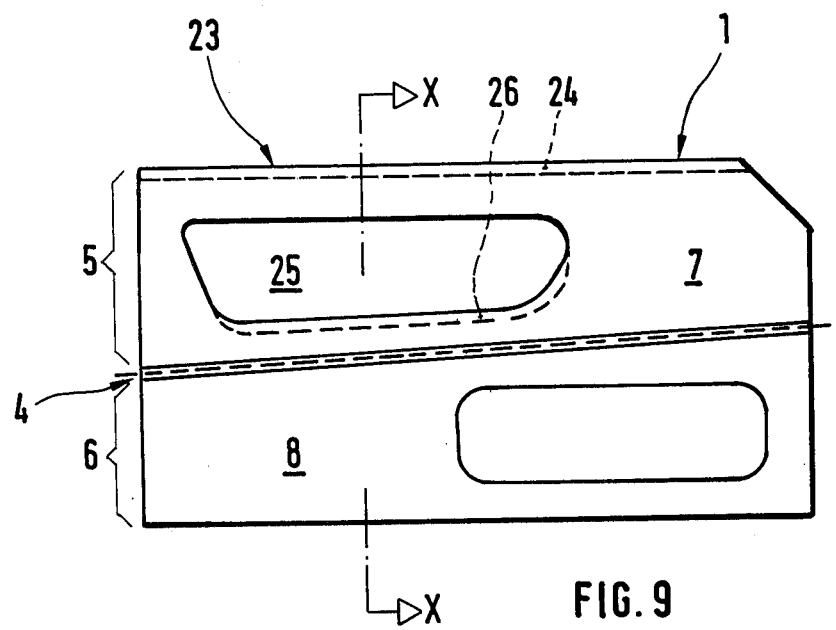
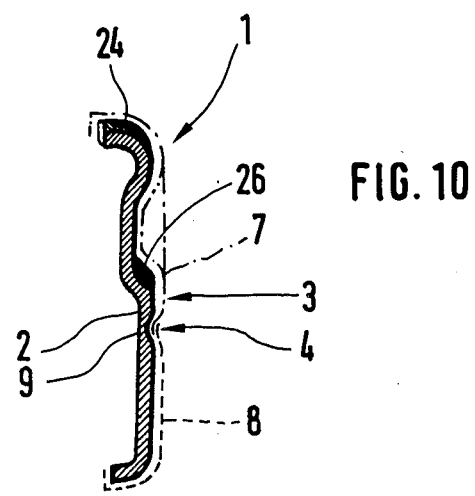

METHOD AND APPARATUS FOR MAKING A SURFACE-LINED ARTICLE

DESCRIPTION

The present invention relates to a method for making a surface-lined shaped article, particularly an interior facing member for a motor vehicle, said article including a backing member which is heated in an undeformed state and then introduced into a temperature-adjusted die assembly in which a surface lining material is provided at a position facing the finally visible surface of said backing member, and is bonded to said backing member during deformation thereof.

A method of the type defined above is known from general practice. The backing material and the liner material are brought together in the die assembly or forming tool in which they are processed together. To this purpose the tool may either be cold or adjusted to a suitable temperature.

The known method is advantageous from the economical viewpoint, as it permits the shaping, bonding and even the edge-cutting steps to be carried out in a single operation.

The method has the disadvantage, however, that the entire surface of the backing member can only be lined with one and the same liner material.

Known from practical use is a different method in which a cold backing material is shaped and cut to size in a heated shaping tool assembly. After having been preshaped in this manner, the backing member is spray-coated with an adhesive and has a liner material bonded thereto in a further tool assembly. This offers the possibility to employ two successive operations for lining the backing member with two different liner materials covering different surface areas.

After the shaped article has been lined in the described manner, a further operation is required for cutting or securing the projecting edges of the liner material. In the case of a shaped article lined with two different liner materials it is moreover necessary to cover the abutment line between the different surface areas with a cover strip.

This known method is disadvantageous in that it requires numerous processing steps which should be avoided for economical reasons. A similarly different method is known from DE-OS No. 31 09 338, in which two cuttings of different liner materials are simultaneously bonded to a preshaped backing member, and not one after the other, as described above. To this purpose the cuttings are mounted in a clamping frame which is then inserted into a separate bonding tool assembly. Clamping means are disposed along the connection line of the two cuttings for holding the cuttings in place. The cuttings are subsequently heated and drawn upwards into the upper die member of the lining tool assembly by evacuating the upper die member.

For bonding the liner material to the preshaped backing member inserted into a lower die member of the tool assembly, the upper die member and the clamping frame are lowered together to a position in which the upper die member rests on the lower die member and the clamping means comes into contact with the surface of the backing member.

The liner material is brought into intimate contact with the backing member by ventilating the space above the liner material, so that the vacuum disappears, and by evacuating the space below the liner material through the backing member, whereby the liner material is drawn into intimate contact with the backing member.

This known method is also rather cumbersome, as it involves numerous separate operations. In particular, the evacuation of the upper and the lower die portion of the tool assembly is costly and requires a very specific construction of the tool assembly. Moreover, this known method is only applicable to air-permeable backing members, as it would otherwise be impossible to draw the liner material against the backing member in the lining step proper. By the same token, the liner material has to be impermeable to air, as the alternating evacuation of the upper and lower die members of the tool assembly would otherwise be futile.

It is an object of the present invention to provide a method of the type defined in the introduction, which permits a shaped article to have at least two of its surface areas lined with different liner materials in a simple and economical manner.

The invention attains this object by providing that the surface liner material is clamped in the die assembly in the form of at least two cuttings covering different areas of the backing member, and the backing member is brought into pressure contact with the clamped cuttings along at least one overlap or abutment, or connection line, respectively, by means of gripper elements acting from above and from below, prior to the backing member being deformed together with the cuttings.

The method according to the invention involves only a small number of operations and is thus cost-effective while offering the possibility to line different surface areas of the shaped article with different liner materials.

In the first place it is to be noted that in the method according to the invention the shaped article is also shaped and lined in a single operation. At the same time it is possible to trim the edges of the shaped article in the same single operation.

Lining of the backing member with different liner materials is accomplished in an unexpected manner irrespective of the elimination of the evacuation arrangement for the tool assembly employed in prior art. Of particular advantage is the fact that the implementation of the invention is not restricted to the use of an air-permeable backing material and an impermeable liner material. The choice of useful materials is accordingly much wider for the purposes of this invention.

The gripper elements form a simple and effective device for positioning and retaining the connection area of the liner material cuttings on the backing member so as to ensure proper alignment therebetween in the subsequent shaping step. In contrast to prior art, the invention provides that the backing member is brought into contact with the cuttings while the latter are clamped in a common plane, so as to position the backing member with respect to the cuttings along the connecting line therebetween. In this context it is important that the backing member is not yet deformed during this stage, and is only subsequently deformed by moving the upper and lower die members of the shaping tool assembly towards one another. This implies that the backing member is only formed after the connection line between the liner material cuttings has been definitely positioned thereon. The deformation of the backing member is thus in a certain manner dependent on the positioning on the connection line between the liner material cuttings. As a result, the connection line between the cuttings is always properly positioned on the backing member and cannot shift to one side or the other as happens frequently in the known, although different methods employing a preshaped backing member.

Thanks to the correct positioning and formation of the connection line the invention permits the employ of a cover-strip to be dispensed with irrespective of the use of different liner materials.

According to an advantageous aspect of the invention, the backing member is bonded to the cuttings along the connection line prior to being deformed. The cuttings are thus not only positioned on the backing member, but also secured thereto at a first location.

According to a further advantageous aspect of the invention, the cuttings are supplied to the die assembly in the form of a web material in a tensioned state. The term "cuttings" is to be broadly interpreted. It includes any type of material suitable for surface linings, irrespective of whether such material is in the form of genuine cuttings having a finite surface area or in the form of an endless web. If the material is employed in the form of a web, care has to be taken that the material has a properly cut or trimmed edge destined for forming the overlap or abutment line, i.e. the connection line.

The supply of a web material in a tensioned state is suitable for an off-the-roll production process and contributes to lowering production costs.

The invention is also directed to apparatus for making shaped articles of the type discussed above. Apparatus of this kind is characterized in that the upper and lower die portions each contain a gripper element for the surface liner material formed of at least two cuttings, said gripper elements being located at mutually opposite positions so as to project from the associated die portion in their gripping position (cf. FIG. 1), and insertable into the respective die portions against the force of a resistance element.

The gripper elements thus project from the associated die portions prior to the deformation process and are effective to position and secure the clamped liner material on the backing member before the latter is deformed together with the cuttings. During the deformation step the gripper elements may be pushed back into the respective die portions against a resisting force, e.g. against the force of a spring, so as not to hamper the deformation movement. The resisting force may be selected so that the force required for the pressure engagement between the cuttings and the backing member is already exerted before the die portions close upon one another. On the other hand, the resisting force may also be selected, as by limiting the depression stroke of the gripper members, so that the required force is only exerted in the deformation step. Intermediate solutions are likewise possible.

With a view to simple construction of the shaping tool assembly, the upper die portion is advantageously provided with clamping means for clamping the cuttings in a plane defining the end position of the associated gripper element in its fully extended gripping position.

Figure 2:
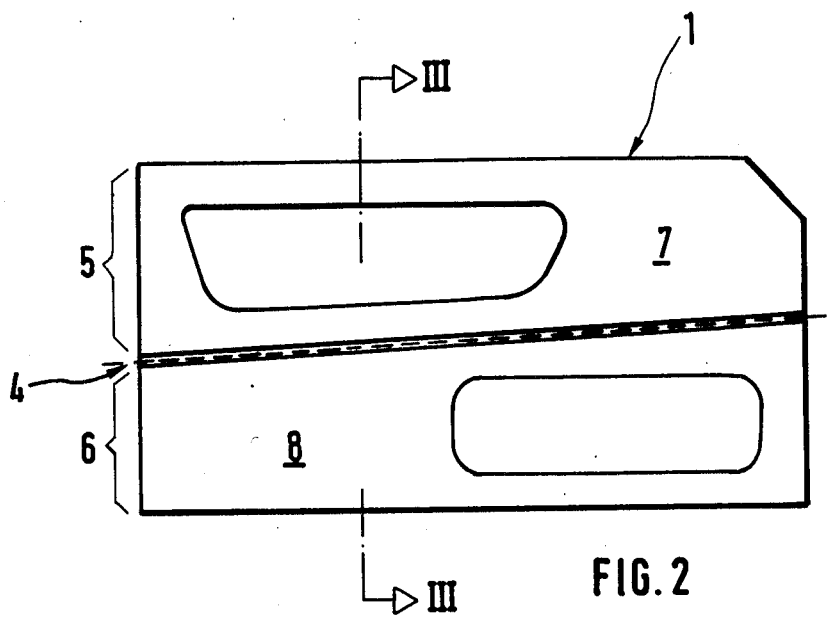
Figure 3:
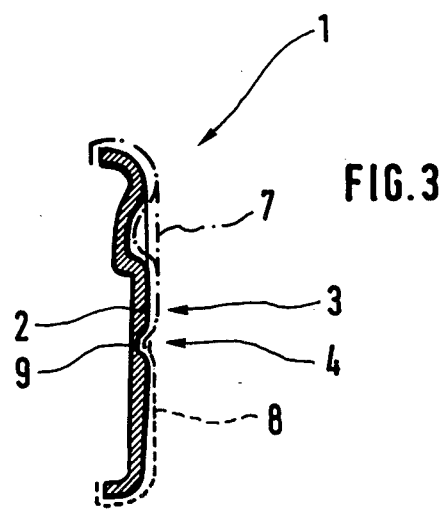
Figure 4:
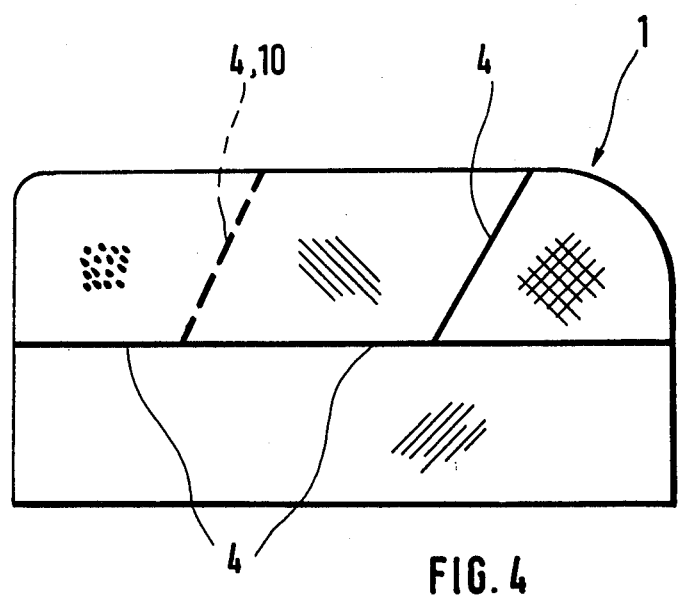
Figure 5:
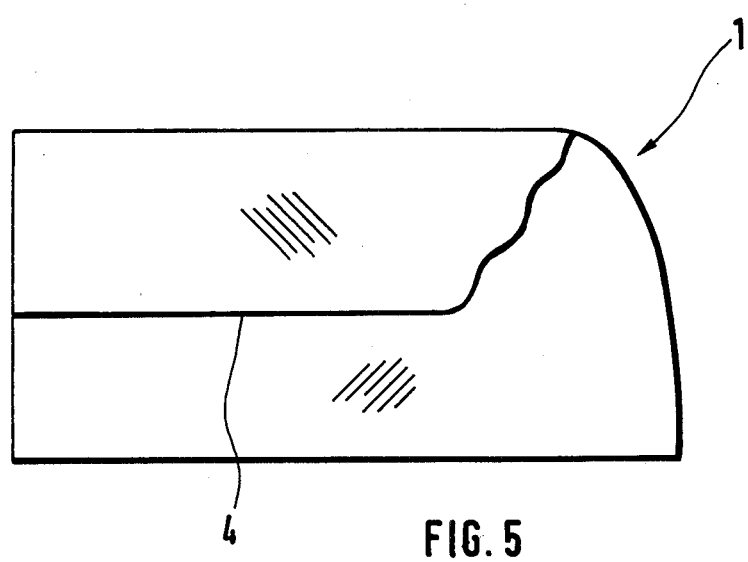
Figure 6:
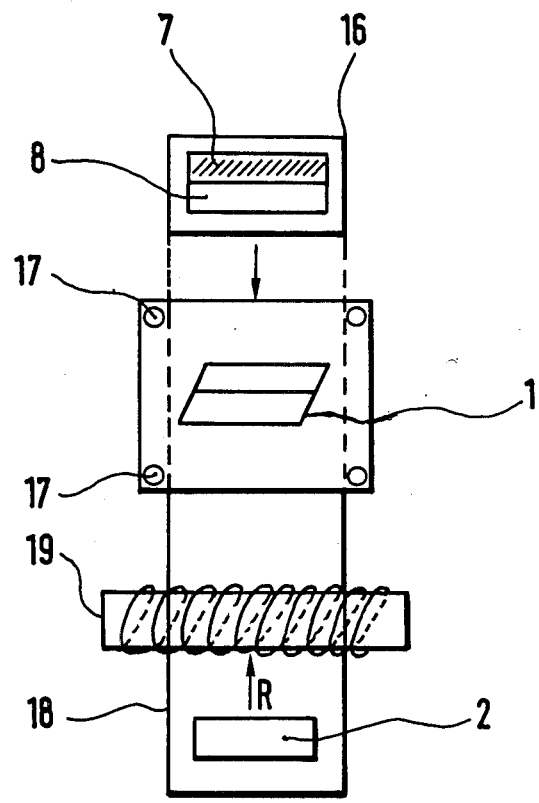
Figure 7:
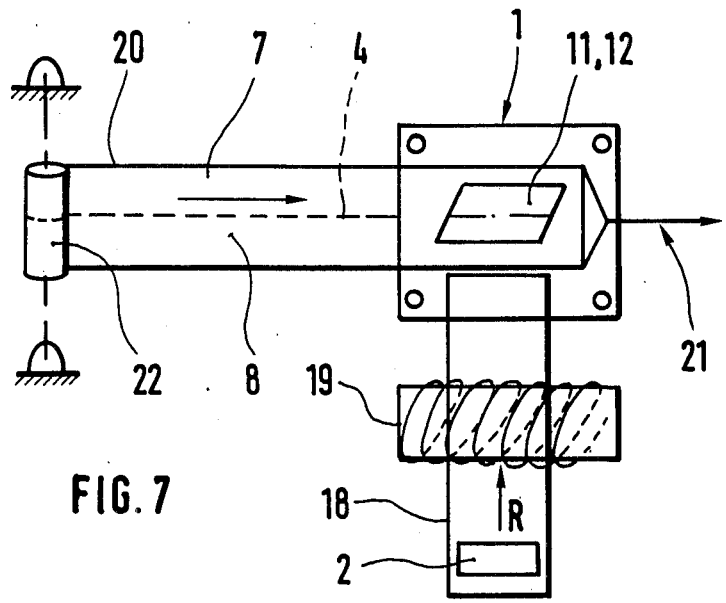
Figure 8:
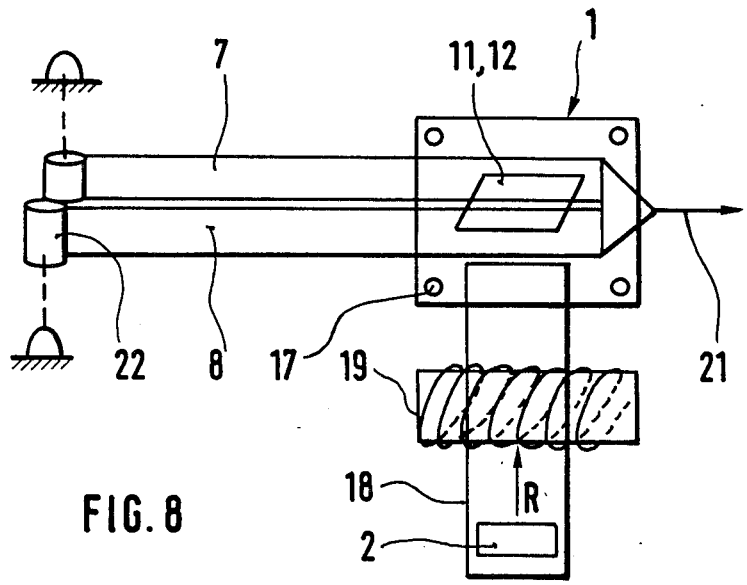

Embodiments of the invention shall now be described with reference to the accompanying drawings, wherein:

FIG. 1 shows a sectional view of apparatus for making a surface-lined shaped article, including an upper and a lower die portion shown in the opened state, FIG. 2 shows a top plan view of a shaped article the surface of which is lined with two separate liner materials, FIG. 3 shows a sectional view of the shaped article of FIG. 2 taken along the line III—III, FIGS. 4 and 5 show top plan views of further shaped articles the surfaces of which are lined with more than two different liner materials, and whereon the separation line between the liner materials does not throughout extend along a straight line, respectively, FIG. 6 shows a diagrammatic top plan view of the apparatus of FIG. 1, FIG. 7 shows a diagrammatic top plan view of a second embodiment of apparatus according to the invention, wherein the liner material is formed by two liner material webs bonded to one another along a common connection line, FIG. 8 shows a diagrammatic top plan view of a further embodiment of apparatus according to the invention, wherein the liner material is supplied in the form of two separate webs, FIG. 9 shows a top plan view of a door facing member provided with upholstery elements at two locations, and FIG. 10 shows a sectional view of the shaped article of FIG. 9 taken along the line X—X.

The devices shown in the drawings serve for making a surface-lined shaped article 1, particularly an interior facing member for a motor vehicle, of the type shown in FIGS. 2 to 5. Each such shaped article has a backing member 2, which in the present case consists of polypropylene with sawdust as a filler material. The backing member 2 is lined with a liner material 3 on the surface which is visible in final use. For the purposes of the present invention, the respective surface is divided into at least two areas separated by an abutment or overlap line 4, i.e. a connection line. On the backing member 2 of FIG. 2 there are only two such areas designated 5 and 6 and destined to be provided with first and second liner material cuttings 7 and 8, respectively. Both cuttings extend over the full length of the shaped article, but only over about half the width thereof. Cutting 8 overlaps cutting 7 along connection line 4. Backing member 2 is formed with a channel 9 of U-shaped cross-section extending accurately along connection line 4.

For demonstrating the different characteristics of the materials of cuttings 7 and 8, the former is shown in dash-dot lines in FIG. 3, while the latter is shown in dash lines.

The shaped article shown in FIG. 4 has three or, if optionally provided additional connection elements are considered, even four surface areas lined with different liner materials. These areas are likewise separated from each other by connection lines. The structural differences of the liner materials are indicated by different patterns. There is one main connection line 4 with two further connection lines 4 and 10, respectively, branching off therefrom at an angle of about 60°.

In the embodiment shown in FIG. 5 the shaped article 1 has two separate surface areas as in the embodiment of FIG. 2. In this case, however, the two areas are separated by a partially curved connection line 4.

FIG. 1 shows a sectional view of apparatus according to the invention for making a surface-lined shaped article 1. The apparatus has a vertically movable upper die portion 11 cooperating with a stationary lower die portion 12. In the embodiment shown, upper die portion 11 is formed with a shaping recess the shape of which corresponds to that of a shaping projection of lower die portion 12. At the location of the connection line 4 of the article to be shaped and lined, upper and lower die portions 11 and 12 are equipped with elongate gripper elements 13 and 14, respectively, which are insertable into the respective die portion against the force of springs. The gripper elements are formed with cooperating gripping surfaces defining the surface shape of the connection line.

Secured to upper die portion 11 by means of conventional fastener elements, e.g. screws 15, is a clamping frame 16 serving to clamp cuttings 7 and 8 in the apparatus in a tensioned state. The clamping frame has a greater projected surface area than shaped article 1 and surrounds upper die portion 11 on all four sides. It is important that the cuttings are tensioned in the direction of connection line 4, so that correct positioning of the cuttings is achieved at this location. They may additionally be tensioned transversely of the connection line 4, as long as it is ensured that this does not interfere with the correct alignment with respect to the connection line.

As shown in FIG. 1, cuttings 7 and 8 are clamped under tension substantially in a common plane E and overlap one another by about 5 mm along the connection line. In the embodiment shown in FIG. 1 the clamping plane E substantially coincides with the lower surface of upper die portion 11.

The elongate gripper element 14 of lower die portion 12 is located opposite gripper element 13, so that their gripping surfaces are capable of exerting a suitable clamping force therebetween, the strength of which is determined by suitably dimensioning the associated springs. The gripper elements may be designed to merely clamp the cuttings to the backing member in the position shown in FIG. 1, or for already bonding these parts to one another in this position, as for instance by HF welding. If the clamping elements 13 and 14 are designed for merely clamping the named parts together in the position shown in FIG. 1, the springs have to be so dimensioned that bonding takes place at least in the course of the shaping movement.

Gripper element 13 in the position shown in FIG. 1 projects from upper die portion 11 to such an extent that its gripping surface extends closely adjacent the plane of the lower surface of the die portion, or even in this plane, which extends parallel and in close proximity to the clamping plane E of clamping frame 16.

Gripper element 14 projects from lower die portion 12 by substantially the same amount as gripper element 13 projects from upper die portion 11.

FIG. 6 shows a top plan view of the apparatus of FIG. 1 and further elements associated therewith. The apparatus is designed as a four-stanchion press the four stanchions 17 of which are located adjacent the corners of the rectangular plan.

Shown at the lower longitudinal side of the press is a conveyor belt 18 for supplying a backing member blank 2 to the press in the direction of arrow R. Prior to entering the press, blank 2 passes a heating station 19 operable to heat the originally cold blank, whereupon the blank is fed to the deforming tool assembly. From above in FIG. 6 the apparatus is fed with clamping frame 16 carrying two cuttings 7 and 8 corresponding to the embodiment of the shaped article shown in FIG. 3.

In carrying out the method according to the invention, two or more cuttings are initially clamped in clamping frame 16 in the desired arrangement. Subsequently clamping frame 16 is secured to upper die portion 11 while the latter is raised off lower die portion 12 to a stand-by position, so that the cuttings clamped in the clamping plane E extend closely adjacent the lower surface of upper die portion 11 or the gripping surface of gripper element 13, respectively. Within clamping plane E clamping frame 16 may be arranged in any suitable manner, with the tension of the cuttings clamped therein being adjustable as desired. Certain liner materials employed for the cuttings or certain shapes of the backing member may require the cuttings to be clamped in such a manner that the connection line therebetween is of arcuate shape so as to compensate displacements of the connection line during the shaping step for obtaining a straight connection line on the finished shaped article.

After having been heated at heating station 19, the blank is carried by conveyor belt 18 towards the shaping tool assembly and deposited on lower die portion 12, while the tool assembly is in its stand-by position. The tool assembly may be cold or pre-heated to a suitable temperature as desired. As the blank is deposited on lower die portion 12, gripper element 14 may already be at its extended position as shown in FIG. 1, or may still be at its retracted position. In the latter case it has to be raised by the amount a as upper and lower die portions 11 and 12 are moved towards one another to the gripping position shown in FIG. 1.

In this position, backing member 2 is brought into contact with cuttings 7 and 8 only along connection line 4 to be clamped together therewith or even to be bonded thereto as by welding or the like. If desired the cooperating gripping surfaces of gripper elements 13 and 14 may be formed with a surface pattern for embossing the connection line with such pattern or for increasing the surface friction of this area.

After the backing member has been clamped to the tensioned cuttings or has been bonded thereto along the connection line, the upper die portion is lowered together with the clamping frame for carrying out the shaping operation. As the die portions approach one another during this shaping operation, gripper elements 13 and 14 are progressively pushed back into their respective die portions. Upper die portion 11 is lowered onto lower die portion 12 to an end position in which the backing member assumes its final shape and the cuttings are bonded to the backing member as a result of the pressure exerted thereon in the shaping process. As the relative positions of the backing memebr and the cuttings are already fixed along connection line 4 prior to the beginning of the shaping process, it is ensured that the shape of the connection line as determined by gripper elements 13 and 14 is accurately maintained. In the example shown, connection line 4 extends along the bottom of channel 9. As in the present case—in contrast to the above discussed different methods—the backing member is only deformed after the cuttings have been fixedly positioned relative to one another and to the backing member, it is ensured that the connection line is located accurately on the bottom of channel 9. The thus obtainable accurate alignment of the connection line makes it possible to dispense with the employ of a cover strip for covering it. At the end of the shaping operation, upper die portion 11 is returned to its raised stand-by position for permitting the finished shaped article 1 to be removed from the apparatus. To this effect ejector member 14 may act as an ejector.

Shown in FIG. 4 is a backing member lined not only with two cuttings but with three or four cuttings. respectively. In making this shaped article, the cuttings are advantageously connected to one another prior to the bonding step as by sewing, welding, adhesively bonding or the like. Subsequently the cuttings may be clamped in a clamping frame in the manner described for further processing.

The same applies to the shaped article shown in FIG. 5, in which two liner material cuttings are connected to one another along a straight line and an undulated line.

The processing of the above described liner materials does not in any case require the employ of a clamping frame, it being also possible to supply the material in a continuous manner from a roll as shown in FIG. 7. This figure shows a top plan view of a four stanchion press similar to the one shown in FIG. 6. The arrangement for feeding the backing material is likewise identical and need not be described again.

The difference of this embodiment lies in the supply of cuttings 7 and 8 from a roll. The two cuttings are connected to one another along a connection line extending parallel to the length of the liner material web 20 before the latter is wound on the roll. The roll is removably mounted at a fixed position so that web 20 is supplied to the stanchion press at right angles to feeding direction R. A diagrammatically shown tensioning means 21 is operable to keep web 20 under tension in the longitudinal direction thereof. The rotation of roll 22 is restricted by brake means for permitting web 20 to be tensioned.

The web 20 permits the liner material to be supplied in consecutive sections in a continuous manner. For maintaining the liner material under tension during its processing, the web may be of greater width than in fact required for lining shaped article 1. This results in the form of residual edge strips which may be wound up for transmitting a pulling force to the liner material web being processed. Alternatively, if the width of web 20 is dimensioned so that it just covers the shaped article, the tension means 21 has to be so designed that it can be connected to the leading end of the web after each lining operation.

All of the embodiments of the apparatus shown in the drawings may be provided with cutter elements (cf. FIG. 1) operable at the end of the shaping operation for trimming projecting portions of the liner material and/or of the backing member, and if need be for smoothening the edges of the shaped article.

The apparatus shown in FIG. 8 is basically similar to the one depicted in FIG. 7, for which reason only the differences therebetween shall be discussed. Identical parts are designated by the same reference numerals.

The main difference between the two embodiments resides in the manner in which the two liner materials 7 and 8 are supplied to the apparatus. In the FIG. 8 embodiment liner materials 7 and 8 are also supplied from a roll 22 without however being connected or bonded to one another. They are supplied to the apparatus in an overlapping arrangement and processed in a similar manner as already explained in context with the embodiments shown in FIGS. 1 and 6, or FIG. 7, respectively.

Generally it is to be noted that in the embodiment of FIG. 8 liner materials 7 and 8 may either be wound on roll 22 in an overlapping arrangement, or that such overlapping arrangement may be established by guide elements located between roll 22 and apparatus.

It is further to be noted that in all of the embodiments shown there is the possibility to arrange the liner material cuttings in overlapping relationship along the connection line or in abutting relationship. It is also possible to bond the liner materials to one another prior to the processing operation. In the latter case the cuttings may also be bent rearwards onto themselves along the connection line. There is of course the further possibility to leave a space between the cuttings along the connection line, so that the backing member is visible along this line.

According to the invention there is always the possibility to bond or otherwise connect the liner material cuttings along the connection line prior to insertion in the clamping frame, after such insertion but prior to the shaping operation, or simultaneously with the shaping operation.

To this effect, the gripper elements may for instance be formed as high frequency electrodes.

The embodiment of FIGS. 9 and 10 substantially corresponds to the one shown in FIGS. 2 and 3, identical or corresponding parts being therefore designated by the same reference numerals. With regard to the basic construction of the wall facing member shown, reference is made to the preceding description. The shaped article of FIGS. 9 and 10 differs from the embodiment of FIGS. 2 and 3 in two aspects. That is, it is provided with an upholstery layer 24 over the full length of its upper edge 23, and a further upholstery layer 26 along the lower edge of a handgrip recess 25. Both upholstery layers serve to cushion the first liner material cutting 7 and are disposed between the cutting and the backing member 2.

The upholstery layers may be formed as shaped elements or as cuttings of any compressible material. The upholstery layers may advantageously be formed of a foamed material capable of being readily bonded to the liner material and/or the backing member.

In making the shaped article shown, upholstery layers 24 and 26 may advantageously be bonded to the liner material in such a manner that they are applied to the areas of the backing member provided therefor on application of the liner material.

In the examples shown, the backing member consists of a thermoplastic material. If intimate bonding to the backing material is to be achieved, the upholstery layers may preferably be formed of a material capable of being readily bonded to the backing material by the action of heat.

In making the shaped article of FIGS. 9 and 10, essentially the same operations are carried out as in the case of the shaped article of FIGS. 2 and 3. Prior to the application of cutting 7, however, upholstery layers 24 and 26 are secured to the liner material as by adhesively bonding or welding.

In the final shaping operation the bond between the upholstery material and the liner material and/or the backing member may be further improved as by the action of heat.

I claim:

1. A method for making a shaped article particularly as an interior facing shaped article for a motor vehicle, the shaped article including a backing member and surface lining material, comprising the steps of positioning surface material in a temperature adjusted die assembly in the form of at least two cuttings having at least one overlap or abutment therebetween, clamping the surface material in the die assembly, heating a backing member in its undeformed state, introducing the heated undeformed backing member into the die assembly with the surface material and backing member facing one another, applying pressure on both sides of the clamped surface material and backing member to bring them into pressure contact with one another along the overlap or abutment, the pressure being applied by gripper element means on each side thereof respectively carried by the die assembly, and closing the die assembly to deform the surface material and backing member together to bond the surface material and backing member to one another and to form the surface material and backing member into the finally shaped article having the two cuttings bonded to different areas of the backing member.

2. A method according to claim 1 wherein the pressure application step bonds the surface material to the backing member along said overlap or abutment before the die assembly closing step.

3. A method according to either claim 1 or 2 wherein the positioning step includes supplying the surface material in the form of a web material in a tensioned state.

4. Apparatus for making a shaped article particularly as an interior facing member for a motor vehicle, said shaped article including a backing member (2) and a surface liner material having at least two cuttings (7, 8) with at least one overlap or abutment therebetween, said apparatus comprising a die assembly having an upper and lower die portion (11, 12) movable relative to one another between open and closed positions, a gripper element (13, 14) carried by each upper and lower die portion in opposition to one another, said gripper elements in the open die position, projecting from their respectively associated die portions into their gripping position to apply pressure to opposite sides of the backing member and surface material positioned therebetween along the overlap or abutment (cf FIG. 1), said gripper elements retracting into their associated die portions against the force of resistance element means (24) as the dies close to bond and deform the backing member and surface liner material positioned therebetween.

5. Apparatus according to claim 4 characterized in that said upper die portion (11) is provided with clamping means (16) for clamping said cuttings in a plane (E) defining the end position of said gripper element (13) in its fully extended gripping position.

* * * * *